United States Patent
Reed et al.

[11] Patent Number: 6,139,303
[45] Date of Patent: Oct. 31, 2000

[54] FIXTURE FOR DISPOSING A LASER BLOCKING MATERIAL IN AN AIRFOIL

[75] Inventors: Gordon M. Reed, Plantsville; Kenneth M. Boucher, Branford; Stanley J. Funk, Plainville; James F. Dolan, Meriden; William A. Nehez, Sr., Wallingford; Christopher P. Jordan, Middletownn; Foster P. Lamm, South Windsor; John H. Vontell, Manchester; Joseph Bak, Eastford; James Whitton, East Berlin, all of Conn.

[73] Assignee: United Technologies Corporation, Hartford, Conn.

[21] Appl. No.: 09/213,593

[22] Filed: Dec. 17, 1998

Related U.S. Application Data

[60] Provisional application No. 60/109,176, Nov. 20, 1998.

[51] Int. Cl.[7] .................................................. B29C 45/14
[52] U.S. Cl. ...................... 425/116; 425/127; 425/129 A
[58] Field of Search ..................................... 425/110, 116, 425/127, 129.1

[56] References Cited

U.S. PATENT DOCUMENTS

| | | | |
|---|---|---|---|
| 4,156,807 | 5/1979 | Howard et al. ......................... | 219/121 |
| 4,256,444 | 3/1981 | Suter ......................................... | 425/73 |
| 4,857,698 | 8/1989 | Perun .................................. | 219/121.71 |
| 4,873,414 | 10/1989 | Ma et al. .............................. | 219/121.7 |
| 5,049,722 | 9/1991 | Corfe .................................. | 219/121.71 |
| 5,140,127 | 8/1992 | Stroud et al. ....................... | 219/121.71 |
| 5,222,617 | 6/1993 | Gregory et al. ................... | 219/121.71 |
| 5,741,450 | 4/1998 | Monroe .................................. | 425/116 |
| 5,912,024 | 6/1999 | Bolanos et al. ......................... | 425/116 |

FOREIGN PATENT DOCUMENTS

| | | |
|---|---|---|
| 4-41090 | 2/1992 | Japan . |
| 4-172194 | 6/1992 | Japan . |
| 7-279611 | 7/1996 | Japan . |
| 2241186 | 8/1991 | United Kingdom . |

OTHER PUBLICATIONS

ASTM D 1238–82; "Standard Test Method for Flow Rates of Thermoplastics by Extrusion Plastometer"–; Published Apr. 1982.

*Primary Examiner*—Tim Heitbrink
*Attorney, Agent, or Firm*—Gene D. Fleischhauer

[57] ABSTRACT

A fixture 56 for disposing laser blocking material 52 on the interior of an airfoil 10 is disclosed. Various construction details are developed which allow for the repetitive disposition of the laser blocking material in one airfoil after another. In one embodiment, the fixture includes a sprue plate 62 and locating block 126 which are spanwisely spaced and engage the ends 14, 18 of the airfoil.

13 Claims, 6 Drawing Sheets

FIXTURE FOR DISPOSING A LASER BLOCKING MATERIAL IN AN AIRFOIL

This application claims benefit from U.S. Provisional Application Serial No. 60/109,176 filed on Nov. 20, 1998.

CROSS-REFERENCE TO RELATED APPLICATION

This application relates to copending U.S. Applications: No. (EH-10084) entitled "Method of Laser Drilling an Airfoil", by Jeffrey D. Flis et al.; No. (EH-10226) entitled method for "Reducing Void Volumes in Cavities for Laser Drilling", by Jeffrey D. Flis et al.; No. (EH-10239A) entitled "Method and Material for Processing a Component for Laser Machining", by Foster Philip Lamm et al.; No. (EH-10240) entitled "Method for Disposing a Laser Blocking Material on the Interior of an Airfoil", by Gordon M. Reed et al.; No. (EH-10206) entitled "Tool for Disposing Laser Blocking Material in an Airfoil", by Christopher P. Jordan et al.; and No. (EH-10241) entitled "Method for Orienting an Airfoil for Processing and for Forming a Mask for the Airfoil", by Stanley J. Funk et al.

DESCRIPTION

1. Technical Field

This invention relates to a fixture for disposing material in an airfoil which includes disposing material in passages of the airfoil for blocking a laser beam from striking the interior once the cooling air hole is drilled through the wall of the airfoil. More particularly, this invention relates to a fixture for disposing material in passages in the airfoil which are in flow communication with other passages through relatively small holes on the interior of the airfoil.

2. Background of the Invention

Airfoils for gas turbine engines are disposed in a flow path for working medium gases. Examples of such airfoils are turbine blades and turbine vanes. The airfoils are bathed in hot gases as the gases are flowed through the engine. Cooling air is flowed though passages on the interior of the airfoil under operative conditions to keep the temperature of the airfoil, such as a turbine vane or turbine blade, within acceptable limits.

In addition, the airfoil may have cooling air holes extending from the interior to the exterior of the airfoil. The cooling air holes are small and may have diameters that are in a range of eleven to seventeen mils (0.011–0.017 inches). The holes are drilled in pre-determined patterns and are contoured to ensure adequate cooling of the airfoil.

The cooling air holes duct cooling air from passages on the interior of the airfoil through the hot walls to the exterior. The cooling air provides transpiration cooling as the air passes through the wall and, after the air is discharged from the airfoil, provides film cooling with a film of air on the exterior. The film of cooling air provides a barrier between the airfoil and the hot, working medium gasses.

One way to drill the holes uses a laser to direct a beam of coherent energy at the exterior of the airfoil. The intense radiation from the laser beam burns through the wall of the airfoil, leaving behind a hole which provides a satisfactory conduit for cooling air. As the laser beam penetrates through the airfoil wall into an interior cavity, the laser beam may strike adjacent structure on the other side of the cavity causing unacceptable damage to the airfoil. Accordingly, blocking material may be disposed in the cavity to block the laser beam from striking walls bounding the cavity after the beam penetrates through the airfoil wall.

One approach is to leave disposed within the airfoil the ceramic casting core around which the blade is poured during the manufacturing process. The ceramic core provides a suitable blocking material. The ceramic core is subsequently removed by well known leaching techniques. This approach is described in U.S. Pat. No. 5,222,617 entitled "Drilling Turbine Blades" issued to Gregore, Griffith and Stroud. However, the presence of the core after casting prevents initial inspection of the interior of the airfoil. The ceramic material may also be difficult to remove once the cooling air holes are drilled. In addition, the core is not available for use with the airfoil during repair processes which may require redrilling of the cooling air holes.

Another example of a blocking material is wax or a wax-like material. The material is melted so that it may easily flow into interior passages, such as the leading edge passage of the airfoil. The temperature of the molten material above its melting point, may exceed two hundred and fifty degrees Fahrenheit (250°). The molten material may be poured by hand or injected into the cavity or may even be sprayed or painted on the surface to be protected. However, the molten material may severely scald personnel working with the material. Moreover, the operation is time consuming if such material is poured by hand into the airfoil. In addition, the wax may extend between two closely adjacent cooling air holes. The wax adjacent the first hole, which blocks the laser beam as the second hole is drilled, may melt as the first hole is drilled by the laser beam. This causes a void to form in the wax. As a result, the energy from the laser beam at the second hole may not be sufficiently dissipated by the wax as it passes through the portion of the passage having the void. Damage may occur to the airfoil as the second hole is drilled because the beam, after it penetrates through the wall at the second hole, may strike the interior wall of the airfoil.

One wax-like blocking material which uses an additive to avoid forming voids is discussed in U.S. Pat. No. 5,049,722, issued to Corfe and Stroud, entitled "Laser Barrier Material And Method Of Laser Drilling." In Corfe, a PTFE (polytetrafluoroethylene) wax-like material is disposed in a wax base. The PTFE helps avoid the formation of voids. Disposing such material on the interior of a leading edge passage is particularly difficult for some airfoils. Often the leading edge passage has no connection during fabrication with the exterior of the airfoil. It is a blind or dead end passage prior to the drilling operation except for small impingement holes which place the passage in gas communication with an adjacent passage. The adjacent passage also has an opening for receiving cooling air which is flowed to the leading edge passage. Accordingly, personnel must carefully pour the molten material in the inlet opening and manipulate the airfoil to avoid bubbles in the material in the leading edge passage.

Still another approach is to use a masking agent, such as an epoxy resin, which is disposed in the airfoil in a fluid state. The epoxy resin is disposed in the airfoil by simply pouring the resin into the airfoil. The epoxy resin is at room temperature and poses no scalding hazard to personnel. The epoxy resin is further processed to harden the fluid and cause it to become a more solid material similar to the PTFE wax mentioned in U.S. Pat. No. 5,049,722. However, the resin is relatively viscous compared to molten wax and has difficulty in flowing through small connecting passages on the interior of the airfoil.

It may be particularly difficult in some airfoils to dispose such material on the interior of a leading edge passage. Often the leading edge passage has no connection during fabrication with the exterior of the airfoil. It is a blind or dead end passage prior to the drilling operation except for small impingement holes which place the passage in gas communication with an adjacent passage. The adjacent passage also has an opening for receiving cooling air which is flowed to the leading edge passage. Accordingly, personnel must carefully pour the molten material in the inlet opening and manipulate the airfoil to avoid bubbles in the material in the leading edge passage and manipulate the airfoil to avoid the formation of voids. The material does have the advantage of being easily removed by heating the material to a temperature that vaporizes the material.

Another approach is to use a thixotropic medium that comprises materials for dispersing laser light. This approach is discussed in U.S. Pat. No. 4,873,414 issued to Ma and Pinder entitled "Laser Drilling of Components". A particular advantage of this medium is that it emits light when contacted by the laser light. Monitoring the light reflected from the component may allow detection of the laser beam as the laser beam breaks through the second surface allowing a feedback control to determine whether or not the laser beam has drilled a through hole. In addition, the viscosity of the medium so that the medium may be decreased by forcing the medium through a nozzle to lower the viscosity of the medium so that the medium flows readily over an inner surface of the component. The thixotropic medium may be removed by contacting the medium with a flushing agent which requires both additional manipulation of the component and the active flowing of additional material into the component.

Another approach is shown in U.S. Pat. No. 5,140,127 entitled "Laser Barrier Material" issued to Stroud and Corse. This approach uses an injectable barrier material which is a composition selected from the group consisting of a first copolymer of tetrafluoroethylene and hexfluoropropylene and a second copolymer having a polytetrafluoroethylene backbone and a least one fluorinated alkoxy side group. The material is poured or injected into the interior of the component. The material is subsequently steamed out of the component after filling and laser drilling the hollow turbine blades. It is likely possible to remove the material in a more passive fashion such as by heating the material to a very high temperature to vaporize the material. However, the products of such combustion will contain fluorine atoms and may result in forming harmful fluids which must be scrubbed from the products of combustion before releasing the products of combustion into the atmosphere.

Another approach is shown in U.S. Pat. No. 5,767,482 entitled "Laser Barrier Material and Method" issued to Turner. Turner uses finely divided crystalline material such as sodium chloride (salt), or other metal salts which are thermally stable and possess a high melting point. Salt may be introduced into the interior of a component by pouring or by making it a paste with water and injecting it. The salt is removed by washing the component with water.

The above art notwithstanding, scientists and engineers working under the direction of Applicants Assignee have sought to develop materials, methods, and devices for disposing laser blocking material on the interior of airfoils which are suitable for use in mass production operations and are relatively easy to remove without forming noxious fluids or without performing several time consuming operations.

SUMMARY OF INVENTION

This invention is in part predicated on the recognition that certain polymers when used to block laser beams, provide a significant advantage in mass production operations and that certain tooling and fixtures may be used with such material or other materials in mass production operations to speed the filling of components such as airfoils. In addition, certain polymers have an advantageous effect on the magnitude of forces transmitted from the blocking material in small passages to the thin walls of the airfoil which forces result from disposing the material in the airfoil and removing the material from the airfoil. In addition, these materials adapt themselves well to rapid processing during the removal operation of the material by heating the materials to their fairly low melting point to allow the melting material to partially escape and then vaporizing the material at a higher temperature in a way that does not form harmful products of combustion.

According to the present invention, a fixture for disposing a laser blocking material in an airfoil includes a sprue plate which exerts a force against one end of the airfoil to support and position the blade in the spanwise direction by urging another part of the airfoil against a surface of softer material, and further includes a passage for receiving pressurized blocking material and discharging the pressurized blocking material into the airfoil.

In accordance with one embodiment of the present invention, the passage in the sprue plate has an opening for discharging the blocking material into the airfoil and further includes a spanwisely extending projection which adapts the sprue plate to engage the root of the airfoil, and which extends about the passage and bears against the root of the airfoil to form a tight seal against the airfoil.

In accordance with another detailed embodiment, a polytetrafluorethylene gasket (which does not cold flow) is disposed between the sprue plate and the root of the airfoil to block the flow of blocking material at the interface between the airfoil and the sprue plate.

In accordance with another detailed embodiment, the sprue plate has a recessed opening which adapts the sprue plate to receive the root of the airfoil and includes walls which extend circumferentially about the gasket to position the gasket with respect to the sprue plate during installation of the airfoil into the sprue plate.

According to one embodiment of the present invention, the fixture includes a sprue plate holder which is attached to a source of pressurized blocking material and the sprue plate slidably engages the sprue plate holder to align the passage in the sprue plate with the root of the airfoil and with the source of pressurized blocking material.

In accordance, with another embodiment, the airfoil is a rotor blade and the fixture includes a plurality of blocks of material, each having a surface which engages the other end of the rotor blade and each block having a different spanwise height to adapt the fixture to engage a rotor blade having a different spanwise length.

A primary feature of the present invention is a fixture having a sprue plate. The sprue plate has a passage for laser blocking material. Another feature is a member, such as a block of material, having a surface facing spanwise towards the sprue plate. Another feature is a sprue plate holder which is adapted to be affixed to a machine for providing the laser blocking material. The sprue plate holder has a slot for slidably engaging the sprue plate. Another feature is an opening in the sprue plate holder through which a nozzle may extend for engaging the sprue plate. In one embodiment, the sprue plate has a projection and a seal surface which adapts the sprue plate to directly engage the airfoil. In another embodiment, the sprue plate has a recess. A gasket in disposed in the recess for forming a seal against the airfoil.

A primary advantage of the present invention is the versatility of the fixture which results from having a sprue plate and member which engages the airfoil in the spanwise direction, each of which may be interchangeable so that the fixture may engage more than one type of airfoil. Another advantage is the simplicity of the design and speed of use which results from having the sprue plate urged toward the member to both fix the airfoil in the spanwise direction and to provide sealing forces at interfaces as laser blocking material is flowed into the airfoil. In one embodiment, an advantage is the speed at which the process may be carried out which results from 1) the direct contact between the nozzle for delivering blocking material and the sprue plate, the contact forming a seal at the interface 2) and having the sprue plate directly engage the airfoil to form a seal at that location.

The foregoing features and advantages of the present invention will become more apparent in light of the following detailed description of the invention and the accompanying drawings.

DETAILED DESCRIPTION OF THE INVENTION

Figure 1:
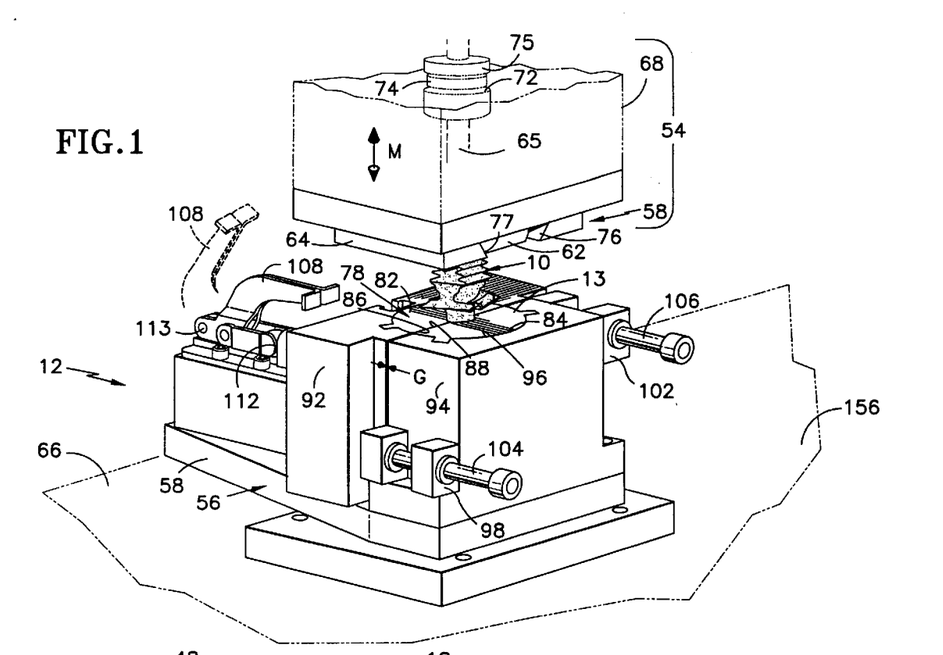
FIG. 1 is perspective view in full of a component, such as an airfoil; of a tool for disposing laser blocking material in the component; and, in phantom, of a portion of a source of laser blocking material, such as an injection molding machine.

FIG. 1 is a partial perspective view of a component, as represented by an airfoil 10 for a gas turbine engine. FIG. 1 also shows a tool 12 for disposing a laser blocking material on the interior of the component. The tool has a cavity 13 in which airfoils are disposed repetitively as, one after another, the airfoils are filled. Although the airfoil shown is a rotor blade the term "airfoil" includes other components having flow directing surfaces such as stator vanes.

Figures 1A, 1B:
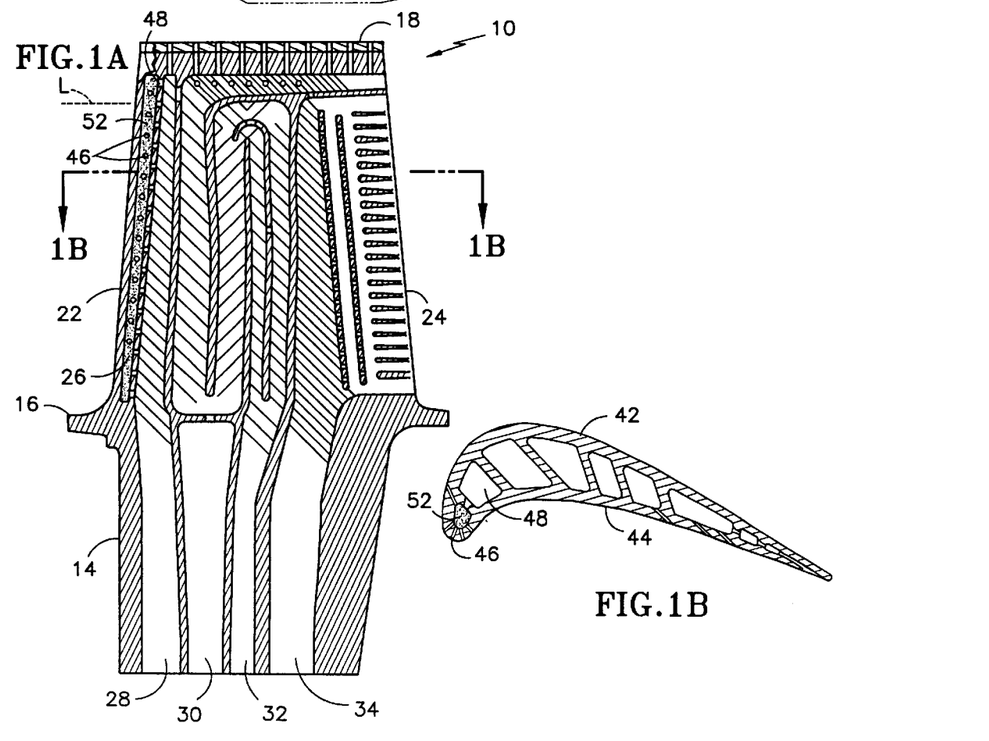
FIG. 1A is a side elevation, cross sectional view of the airfoil shown in FIG. 1.
FIG. 1B is a cross-sectional view of the airfoil shown in FIG. 1A taken along the lines 1B—1B of FIG. 1A.

FIG. 1A is a side elevation cross sectional view of the rotor blade 10 during manufacture. The rotor blade has a first end, as represented by the root 14, a platform 16, and a second end, as represented by the tip 18. The airfoil has an aerodynamic leading edge 22 which extends spanwise. An aerodynamic trailing edge 24 is spaced chordwise from the aerodynamic leading edge. The airfoil has a plurality of cavities or passages for cooling air as represented by the leading edge passage 26 and passages 28, 30, 32, 34 which extend through the root of the rotor blade. The passages 28, 30, 32, and 34 extend into the interior of the rotor blade and often extend in serpentine fashion as represented by the passage 32.

FIG. 1B is a cross sectional view taken chordwise along the line 1B—1B of FIG. 1A. The airfoil has flow directing surfaces, as represented by the suction surface side or sidewall 42 and the pressure surface side or sidewall 44. Each of these surfaces extend rearwardly from the leading edge to the trailing edge and extend spanwise between the platform 16 and the tip 18.

A plurality of internal impingement holes, as represented by the hole 48, connect the leading edge passage 26 in the leading edge region with the supply passage 28 for cooling air. The impingement holes are of small size and have a hydraulic diameter that is typically less than forty (40) mils (that is, $D_h=4Ai/P=0.040$ inches, where A is the area of the hole and P is the perimeter of the hole). In some applications, the holes may have a hydraulic diameter that is less than thirty (30) mils. A plurality of film cooling holes adjacent the leading edge 22, as represented by the holes 46, extend from the impingement passage 26 in the leading edge region to the exterior of the rotor blade.

As shown in FIG. 1B, one way of forming the film cooling hole 46 is to drill the hole with a laser beam, as represented by the laser beam L, from the exterior of the airfoil to the leading edge passage 26. As shown in FIG. 1B and in schematic fashion in FIG. 1A, a laser blocking material 52 is disposed in the leading edge passage on a portion of the component for attenuating the intensity of the laser beam. The laser blocking material ensures that the laser beam does not injure structure that faces the cooling air hole as the laser beam breaks through the wall of the rotor blade during the drilling process.

As shown in FIG. 1, means for supplying the blocking material under pressure, as represented by part of an injection-molding machine 54, is in flow communication with the tool 12. Alternate equivalent machines include any machine capable of being a source of pressurized laser blocking material to the airfoil such as transfer molding machines and plastic extrusion machines.

The tool 12 includes a fixture 56 for engaging the rotor blade and filling the rotor blade with laser blocking material. The term "filling" means to dispose or supply the material and includes partially filling or completely filling the blade. The fixture includes a base 58, sprue plate 62 and sprue plate holder 64. A passage 65 for supplying the laser blocking material extends through the sprue plate and sprue plate holder.

Figure 3:
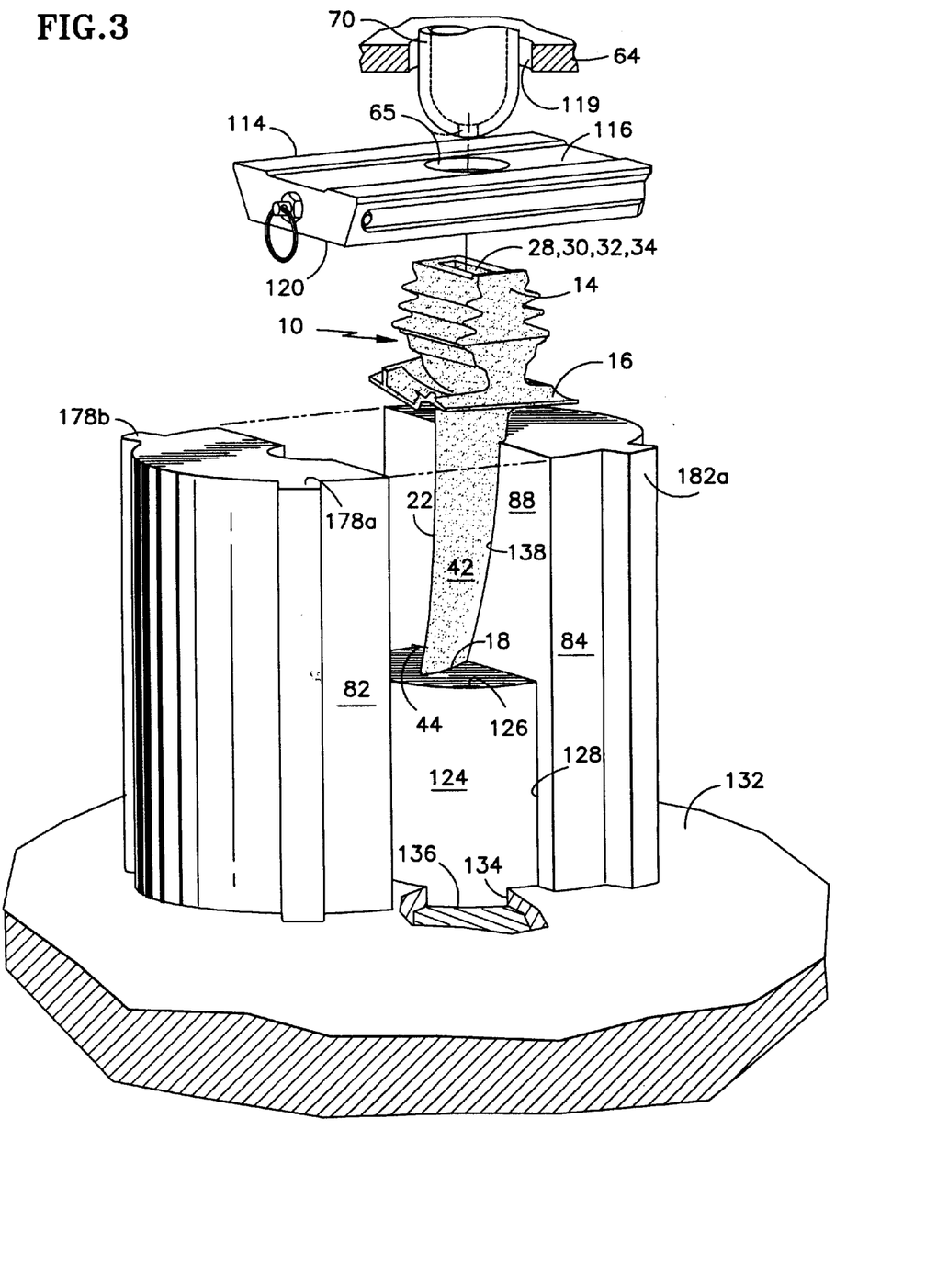
FIG. 3 is an exploded view of part of a nozzle for the injection molding machine and part of the tool shown in FIG. 1, which has a pair of mask members.
Figure 3A:
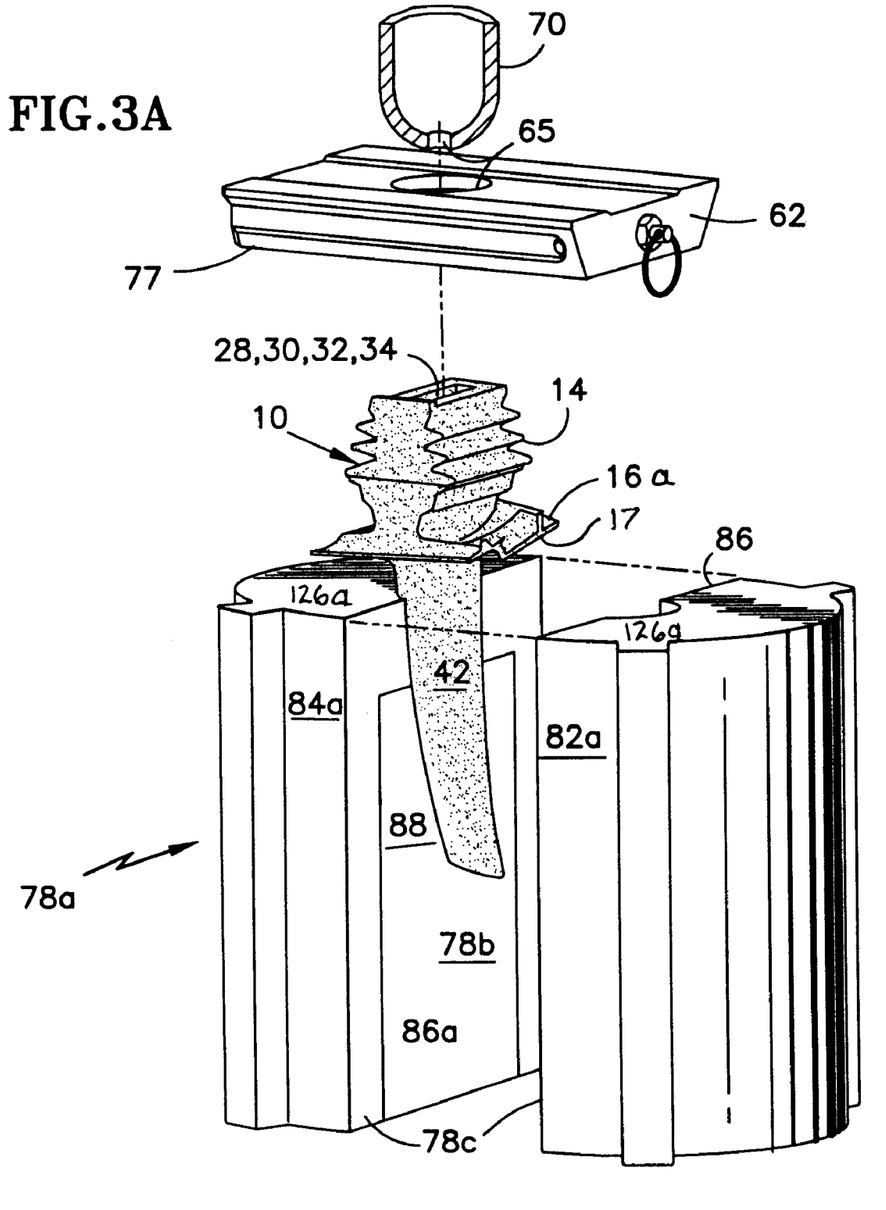
FIG. 3A is alternate embodiment of a portion of the tool shown in FIG. 3A showing mask members formed in part of fairly rigid material which engages the platform of the airfoil shown in FIG. 3.

The injection molding machine has a table 66 for receiving the tool and a housing 68 that has a nozzle 70 as shown in FIG. 3 and FIG. 3A. The housing is movable in the direction M with respect to the tool 12 and can exert a predetermined force on the tool and on the rotor blade. The housing has a chamber 72 for receiving a charge 74 of laser blocking material 52 (shown in schematic fashion). The volume of the charge is slightly larger than the internal volume of the interior of the airfoil which is receiving the laser blocking material.

The chamber 72 receives the laser blocking material from a passage (not shown) which has disposed therein screw means (not shown) for forcing the laser blocking material into the chamber. A piston 75 is disposed in the chamber for driving the laser blocking material in passage 65 through the housing to the sprue plate. One satisfactory machine for this purpose is the Model 70 Injection Molding Machine available from the Mini-Jector Machinery Corp., Newbury, Ohio. Another machine which has proven satisfactory is the Toyo Plastar TI-90G2 injection molding machine available from the Hitachi Group through Toyo of America, 16 Chapin, Pinebrook N.J. 07053.

As shown in FIG. 1, the sprue plate holder 64 of the tool 12 is integrally joined, such as by bolts (not shown), to the housing 68 of the injection molding machine 54. The sprue plate holder has a dove tail slot 76. The sprue plate 62 slidably engages the sprue plate holder through the dovetail slot and has tapered edges 77 which cooperate with the dovetail slot to retain the sprue plate. The sprue plate has part of the passage 65 for receiving the laser blocking material. The passage places the chamber 72 of the injection molding machine in flow communication with the passages 28, 30, 32, 34 which extend through the root 14 of the turbine blade 10.

The table is adjustable with respect to the housing 68 of the injection molding machine 54. The tool base 58 is located in predetermined fashion with respect to the table 66. The base is adapted by locating dowels or locating pins (not shown) for this purpose to precisely engage the table at the same location each time that the fixture is installed on the table. Accordingly, the tool base is adjustable through the table with respect to the housing.

The tool includes a mask 78. The mask has a pair of mask members, as represented by the first mask member 82 and the second mask member 84. The mask members each have a surface, as represented by the first surface 86 of the first mask member and the second surface 88 of the second mask member. The surfaces each conform to the exterior of the airfoil. The mask members are formed of elastomeric material such as room temperature vulcanized (RTV) rubber. One satisfactory elastomer is material is RTV 668 Elastomeric material available from the General Electric Company, Waterford, N.Y.

The tool further includes a pair of opposed jaws as represented by the first jaw 92 and the second jaw 94. Each jaw engages an associated mask member 82, 84 for urging the mask member into a faying relationship with the airfoil 10. For example, the second jaw 94 engages the second mask member 84. Because the second jaw is fixed to the base of the tool, the second jaw provides a reference surface 96 with respect to both the housing 68 and to the second mask member 84. The housing positions the sprue plate. Accordingly, the second jaw with its chordwise facing reference surface provides, in combination with the sprue plate and the sprue plate holder, a precise way of aligning the rotor blade with the injection molding machine during the filling operation.

The jaws 92, 94 are capable of relative movement with respect to each other. As shown by the phantom lines in FIG. 1, the first jaw is movable with respect to the second jaw from the closed position shown in full to an open position shown in phantom. The second jaw 94 has a pair of guides for such movement disposed on each side of the jaw, as represented by the guides 98 and the guides 102. The first jaw 92 has a first guide rail 104 which slidably engages the first pair of guides 98. The first jaw has a second guide rail 106 which slidably engages the second pair of guides 102. Alternatively, such relative movement might be accomplished by moving both jaws. As mentioned above, the second jaw provides the reference surface 96 for locating the mask 78 with respect to the housing of the injection molding machine. This feature might be replicated provided the second jaw returns precisely to its closed position.

The tool includes means for moving the jaws from the open position to the closed position, as represented by the arm 108 and lever 112 mechanism shown in FIG. 1. The arm is pivoted about a pivot point 113. As the arm pivots to the open, moved position, the lever pulls the first jaw 92 and the first mask member 82 away from the rotor blade 10 enabling the operator to rapidly remove or insert a rotor blade into the second masking member 84. Other devices for the means for moving the jaw might be actuated by electrical, pneumatic or hydraulic arrangements or mechanical actuators such as chains, pulleys, or springs.

Figure 2:
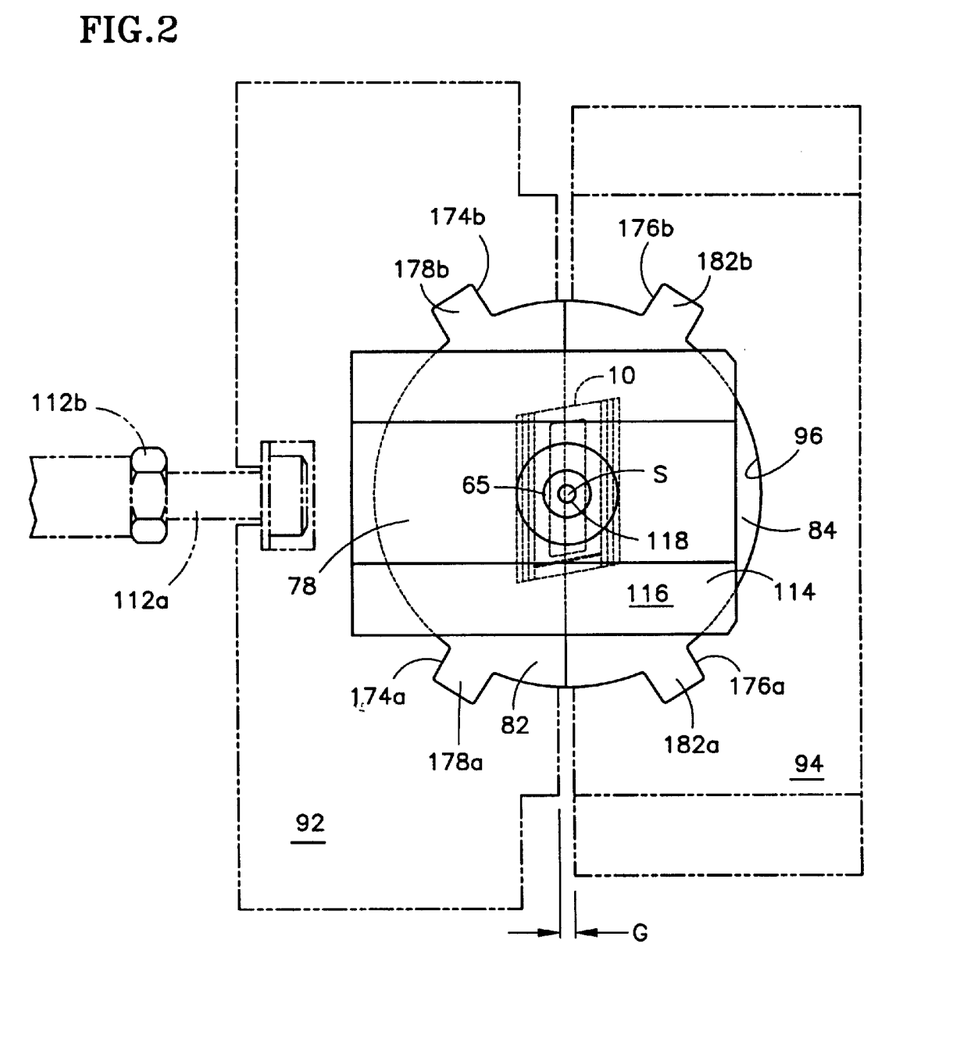
FIG. 2 is a view from above of FIG. 1 with portions of the tool and injection molding machine either broken away for clarity or shown in phantom.

FIG. 2 is a view from above of FIG. 1 with portions of the tool 12 and the injection molding machine 54 broken away for clarity. FIG. 2 shows the relationship of the rotor blade 10 to the sprue plate 62 and to the passage 65 extending spanwise through the sprue plate. The passage adapts the sprue plate to receive the pressurized blocking material from the nozzle 70 of the injection molding machine. The sprue plate has a first side 114 having a first spanwise facing surface 116. The surface 116 faces spanwise away from the rotor blade in the operative condition in a first direction along a spanwise axis S. As shown in FIG. 2, the spanwise axis S is the stacking line of the chordwise sections of the rotor blade. The first surface 116 adapts the sprue plate to engage the nozzle (shown in FIG. 3) and form a seal about the passage 65 for receiving the pressurized blocking material.

The passage 65 has a narrow portion 118 for discharging the pressurized blocking material into the rotor blade 10. The narrow portion of the passage is in flow communication with the opening formed by the passages 28, 30, 32, 34 in the root of the rotor blade. These passages adapt the root to receive the laser blocking material from the injection molding machine.

The first jaw 92 of the tool 12 is shown in phantom. The lever 112 has an end portion 112a (shown in phantom) which engages the first jaw. The lever has an adjustable link 112b which allows for adjustment of the length of the lever. The second jaw 94 (shown in phantom) is spaced from the first jaw by a small gap G in the operative closed condition. This gap is typically small and in one embodiment is less than twenty five to thirty mils (0.025–0.030 inches).

FIG. 3 is an exploded view, partially broken away, showing part of the tool 12 and part of the nozzle 70 of the injection molding machine 54. The tool includes the fixture 56. The fixture includes the tool base 58, the sprue plate 62, and the sprue plate holder 64. The sprue plate holder has an opening 119. The nozzle 70 extends through the opening 119 to engage the sprue plate 62. The nozzle is pressed against the first surface 116 of the first side 114 by bolts (not shown) which urge the nozzle and sprue plate together. The sprue plate 62 has a second side 120 having a second spanwise facing surface 122.

The fixture 56 also includes a member, as represented by a block 124 (locating block), which is spaced spanwise from the sprue plate. The locating block 124 has a first reference surface 126 which faces in the spanwise direction and which engages the tip 18 of the airfoil 10 in the operative condition. The locating block is formed of a material that is softer than the tip of the airfoil to avoid damaging the tip of the airfoil. The second mask member is adapted by a first opening 128 to receive the block of material. As shown, the locating block is nested (put snugly inside) the second mask member 84 and helps the second jaw locate the second mask member.

The tool base 58 has a surface 132. The first mask member 82 and second mask member 84 rest on the surface 132. The tool base has a locating hole 134 and a base reference surface 136 bounding the bottom of the hole for positioning the locating block 124. The locating block is disposed in the circular hole in the tool base to precisely locate the block of material with respect to the tool base of the fixture. In an alternate embodiment, the tool base might be the member having the first reference surface 126 for engaging the tip of the airfoil and would use the base reference surface 136 for this purpose.

The second mask member 128 has a second opening 138 which conforms to an aerodynamic edge of the airfoil, such as the leading edge 22 of the airfoil. The second mask member overlaps the leading edge of the airfoil on both the suction side 42 and the pressure side 44 of the airfoil. This engagement aids the mask in supporting and positioning the airfoil as the mask members are moved relative one to the other and moved into engagement with the airfoil. In an alternate embodiment, the mask might overlap both edges or only the trailing edge 24 of the airfoil.

FIG. 3A is an alternate embodiment of the fixture shown in FIG. 3 having a mask 78*a*. The mask 78*a* has a first mask member 82*a* and a second mask member 84*a*. The mask 78*a* may be formed with a pliant material at the faying surfaces of the airfoil, such as a liner 78*b*, in combination with a reasonably rigid support 78*c* of material of the type used for the locating block 124. Each mask member has a portion of the first reference surface 126*a* that engages a spanwise facing surface 17 on the airfoil. As shown, the spanwise facing surface 17 is on the platform 16*a* of the airfoil. The surface is similar to the spanwise facing surface of the second end or tip 18 of the airfoil in that the surface 17 of platform 16*a* is adapted to engage the first reference surface 126*a* of the support 78*c* for performing the function of locating block 124 to position the airfoil in the spanwise direction.

Figure 4:
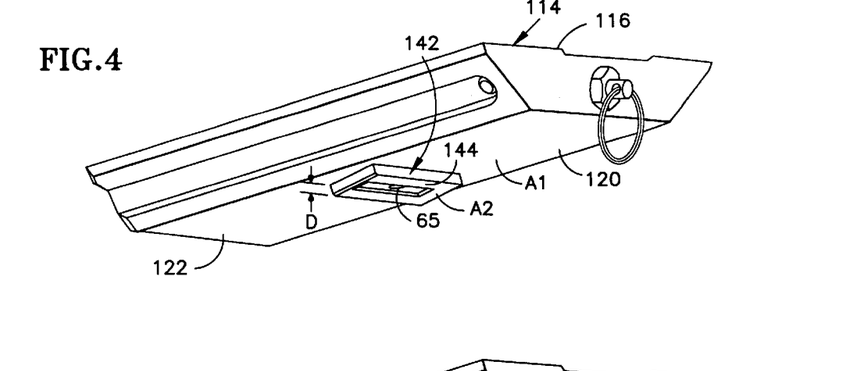
FIG. 4 is perspective view from below of a sprue plate shown in FIG. 1 and FIG. 3.

FIG. 4 is a perspective view from below of the sprue plate 62. The second spanwise facing surface 122 has an area A1. The second surface faces spanwise toward the rotor blade in the operative condition. The second side 120 has a projection 142 which extends in the spanwise direction a distance D which is about sixty (60) mils. The projection extends around the passage 65 to provide a bounded perimeter about the passage. The projection further has a third surface 144 that provides another (second) reference surface that faces in the spanwise direction for engaging the airfoil. The third surface (second spanwise facing reference surface) has a spanwise facing area A2 which is less than the area A1 (A2<A1).

The area A2 provides a sealing area or seal surface to the sprue plate. The third surface 144 having the area A2 (second spanwise facing reference surface) has a surface finish corresponding to a smooth machine finish with a surface roughness Ra measurement of about sixty three (63) micro inches as measured in accordance with the procedures set forth in specification "ANSI B46.1-1985 Surface Texture" available from the American National Standards Institute showing measurements as an average from the mean. The rotor blade has a surface having a finish corresponding to a fine machine finish with a surface roughness finish Ra of about one hundred and twenty five (125) micro inches.

The sprue plate holder 64 is integrally attached to the injection machine such as by fastening means or bonding. The sprue plate 62 is fixed to the sprue plate holder by a set screw or other device for fixing the holder to the plate. In the embodiment shown, fastening means (not shown) urge the sprue plate holder 64 toward the housing 68 of the injection molding machine 54 and the sprue plate holder urges the sprue plate upwardly against the nozzle 70. In the operative condition, the sprue plate and the nozzle 70 of the injection machine are pressed together tight enough to form a seal to block the loss of laser blocking material from the passage 65. The housing of the injection machine pushes downwardly on the sprue plate holder 62 with a force F of about one hundred pounds (100 lbf). This pushes the other side of the sprue plate against the airfoil to form a seal (at the interface between the reduced area A1 and the root of the airfoil). The force F is transmitted through the airfoil and presses the airfoil tip (second end) against the block 124, trapping the airfoil spanwise between the block and the sprue plate.

In an alternate embodiment, the nozzle might press against the sprue plate and that force would urge the sprue plate against the root 14 (second end) of the airfoil. Again, this forms a seal between the sprue plate and the airfoil at the second spanwise facing reference surface 144 of the sprue plate and the root.

As mentioned, the locating block surface 126 (first reference surface) is softer than the tip of the rotor blade so that the tip 18 of the rotor blade is not injured as the injection molding machine presses the airfoil against the block. Under operative conditions, the pressurized material exits the nozzle at a pressure of about sixteen hundred pounds per square inch (1600 psi) and a temperature of about three hundred degrees Fahrenheit (300° F.).

Figures 5, 7:
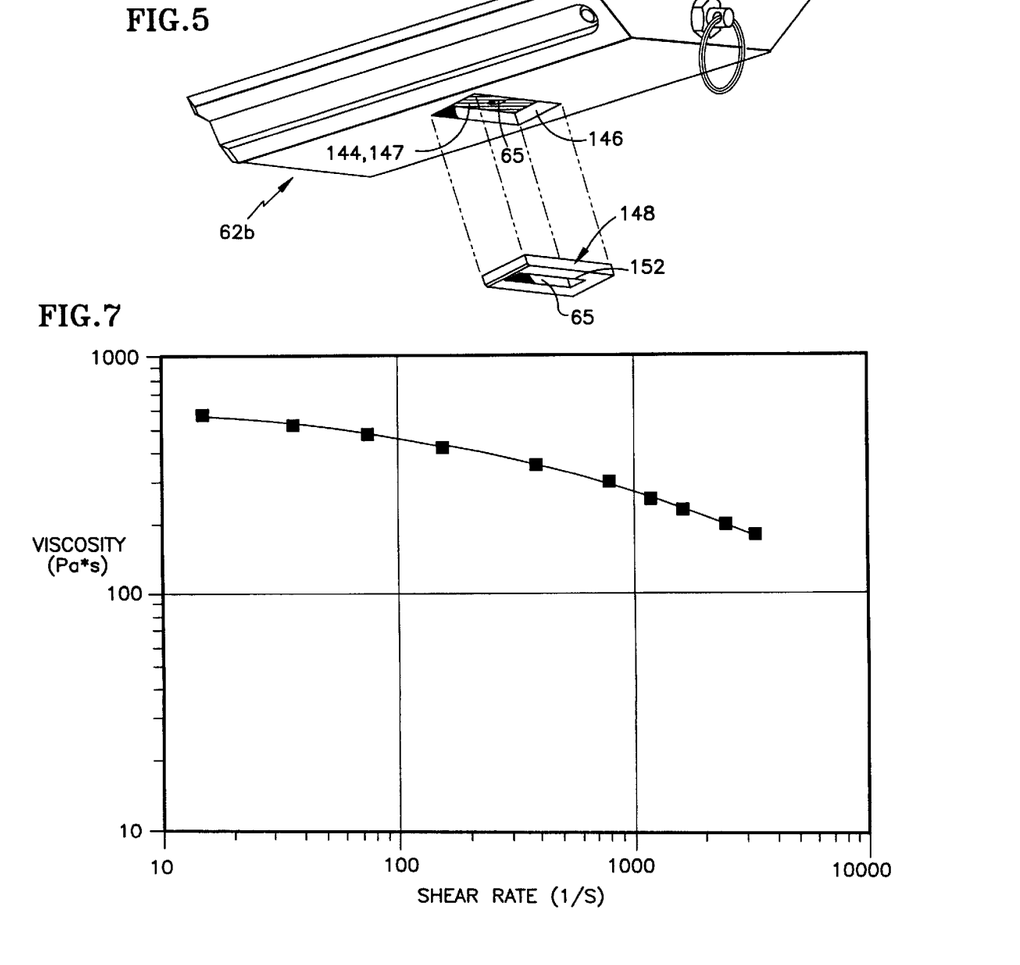
FIG. 5 is a perspective view from below of an alternate embodiment of the sprue plate shown in FIG. 4 having a recess for a seal, and showing in exploded fashion, a seal member which fits in the recess.
FIG. 7 is a graphical representation of the shear thinning characteristic for a linear polyethylene polymer and shows viscosity in Pascal Seconds as a function of shear rate in reciprocal seconds.

FIG. 5 is an alternate embodiment 62*b* of the sprue plate 62 shown in FIG. 4. The sprue plate 62*b* is formed of a hardened two part epoxy available from the Ciba-Geigy Corporation., 4917 Dawn Avenue, East Lansing, Mich. 48823-5691. The material is supplied as R4036 resin with an R1500 hardener. This is one example of a suitable material for the locating block 124.

The sprue plate 62*b* shown in FIG. 5 has a recess 146 for receiving the root 14 of the rotor blade. The recess has a seal surface 147 which adapts the sprue plate 62*b* to receive a polytetrafluoroethylene seal. The polytetrafluoroethylene seal is urged tightly against the sprue plate and against the rotor blade by the injection molding machine. The polytetrafluoroethylene seal has an opening 152 for passing the laser blocking material along the passage 65 from the sprue plate to the rotor blade. In one embodiment, the seal is about three fourths of inch long and one-half of an inch wide with an opening suitable for flowing the blocking material into the root of the airfoil. One satisfactory material for the seal is mechanical grade Teflon® material which has a very small tendency to cold flow. This material is provided in sheet form by Interplast, Inc., One Connecticut Drive, Burlington, N.J. 08016-4101. Interplast is a processor of Dupont Teflon® material.

The fixture 56 may be used in the process for orienting airfoil 10 with respect to any machine for injecting laser blocking material, such as the injection molding machine 54.

Figure 6:
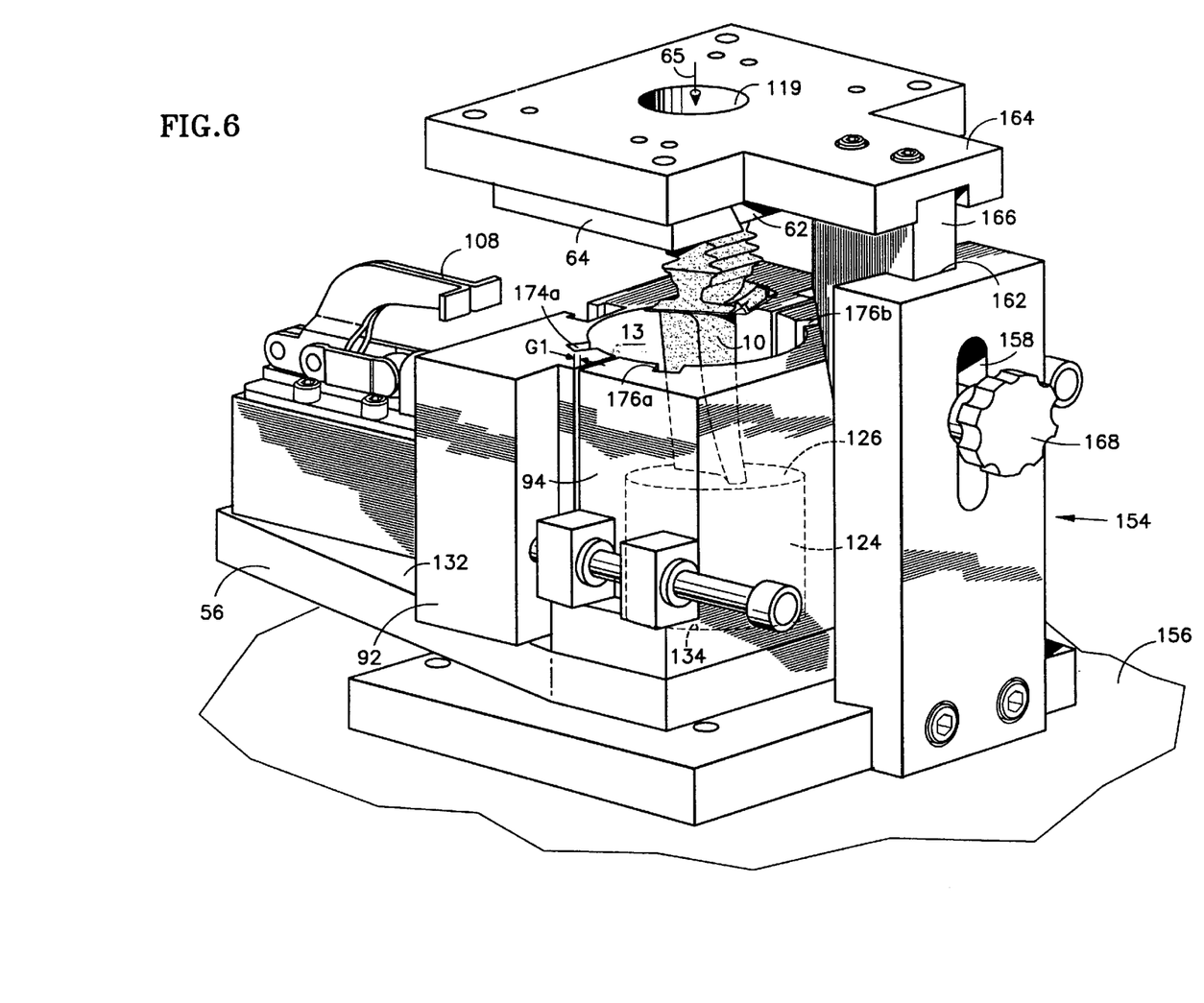
FIG. 6 is a perspective view of the tool shown in FIG. 1 installed on an apparatus for orienting the airfoil with respect to a source of laser blocking material and shows a sprue plate and a sprue plate holder which has been modified slightly to engage the apparatus.

One method for orienting a new airfoil with respect to the injection machine so that like airfoils may be repetitively filled using the toot 12. The first step is to remove the tool 12 from the machine and to install the tool in an apparatus 154 as shown in FIG. 6. The apparatus has a table 156, similar to the table 66 shown for the injection molding machine. The table has locating pins (not shown) which locate the tool in a predetermined relationship to the table. The base of the tool has the locating hole 134 for positioning the locating block 124. The locating block engages the tip of the airfoil with the first reference surface. The combination of the tool 12 and table 158 locate the locating block in a known position with respect to the apparatus so that the tip 18 (second end) of the airfoil is positioned with respect to the apparatus. Airfoils of different length are easily accommodated in the fixture changing the block to a block having a suitable height.

The apparatus has a vertical member 154 having a groove 158. The apparatus has a laterally extending plate 164. The plate has a vertical support 164 which slidably engages the groove. The plate is integrally attached to the vertical support and is adjustable with respect to the vertical member by means of a locking clamp 166. In the embodiment shown, the apparatus plate is adapted to engage the sprue plate holder 64 to locate the sprue plate holder and sprue plate 62 precisely in the spanwise direction with respect to the first reference surface 126 of the locating block and with the same relationship to the first reference surface in the spanwise direction as in the operative condition.

A device, such as a sprue plate element, simulating the sprue plate 62 might be used in place of the sprue plate as long as the device provides the correct orientation of the root (first end) 14 of the airfoil to the first reference surface. The sprue plate element and the sprue plate are each represented by the sprue plate 62 shown in FIG. 6. The advantage of using the sprue plate and the sprue plate holder or a device simulating the sprue plate holder is that it reproduces the engagement of sprue plate in the operative condition to the airfoil and to the other parts of the tool.

The method for orienting the airfoil 10 with respect to the injection molding machine 54 includes forming the fixture so that it has the cavity 13. The cavity adapts the fixture to receive the elastomeric mask members 82, 84 of the mask 78 for engaging the airfoil in the operative condition.

The method includes forming the mask 78 for engaging the airfoil. This includes the steps of forming a core having an airfoil portion which is dimensionally equivalent to the airfoil which is to be filled, at least over that region of the core which engages the mask. Alternatively, an actual airfoil might be used for the core. After disposing the core in the cavity, the plate 164 of the apparatus and the sprue plate 114 are adjusted to orient the sprue plate with respect to the airfoil, to the fixed second jaw 94, and to the first reference surface 126 on the locating block 124. This method includes trapping the core between the sprue plate and the first reference surface such that the orientation of the core to the sprue plate and the core to the first reference surface is the same as in the operative condition.

The method includes disposing a masking material in fluid form in the cavity 13 and allowing the material to harden. One satisfactory material is an elastomeric material such as room temperature, vulcanized material available as R668 from the General Electric Company.

As shown in FIG. 2, the first jaw 92 and the second jaw 94 each have a pair of spanwise extending grooves as represented by the grooves 174*a*, 174*b* and the grooves 176*a*, 176*b*. The masking material flows into these grooves. This material hardens to form strips on the mask. The strips are represented by the strips 178*a*, 178*b* which engage the grooves 174*a*, 174*b* of the first jaw and the strips 182*a*, 182*b* which engage the grooves 176*a*, 176*b* of the second jaw. The strips extend in the grooves and engage the jaws in a chordwise direction substantially perpendicular to the surfaces of the jaws.

After the material hardens, the step of forming the mask 78 includes cutting the masking material in a generally spanwise direction to form a single parting line if a one piece mask is desired or two parting lines if a two-piece mask is desired. The parting line enables removal of the core and insertion of the airfoil in the operative condition.

In the embodiment shown in FIG. 6, two parting lines are made on either side of the airfoil to divide the masking member into the pair of mask members 82, 84. In alternate embodiments, it might be desirable to have more than a pair of mask members. The mask members are cut such that each parting line extends between the cooling air holes of the finally manufactured airfoil. This enables the mask to block the flow of blocking material out of the holes 46 of the airfoil to such an extent that the material does not flow to locating surfaces on the airfoil for the laser drilling operation. This is important in those cases where a repaired airfoil is being redrilled or a newly manufactured airfoil is being reworked and the airfoil already has some cooling holes 46 formed in the surface of the airfoil.

The jaws 92, 94 of the tool are movable relative to each other. The method of orienting the airfoil by forming the mask includes spacing the jaws one from the other by the gap G in the closed position. (The gap G is the distance that the jaws are spaced in the operative condition.) A layer of molding material is disposed between the jaws to fill the gap G. The molding material seals the mold against the loss of masking material in fluid form. One satisfactory material is beeswax. Alternatively, the jaws might be spaced apart by a gap G1 which is greater than the gap G. This might be achieved during the step of forming the mask by not fully closing the jaws. This results in the lateral length of the mask being slightly greater than the lateral width of the cavity in the operative condition. The jaws under operative conditions will then exert a predetermined level of force on the masking member. The same effect might be achieved by adjusting the length of the lever which moves the jaw. This might be done by employing an adjustable link 112*b* so that the jaws move to the fully closed position with a gap G in the operative condition but are adjusted so that the jaws are spaced apart by the gap G1. One satisfactory gap G1 was set at about one eighth of an inch (125 mils). The gap G1 for the tool in the closed position in one embodiment was about four times of the gap G for the tool in the operative condition.

A particular advantage of the tool 12 is the second jaw 94 which does not move. That jaw and the second chordwise facing reference surface 96 have a predetermined relationship with respect to the locating hole 134 because both are fixed. The locating hole positions, in turn, the locating block 124 having the first reference surface 126. These known relationships cause the mask 78 and its mask members 82, 84 which engage the jaw to have a known relationship with respect to the airfoil (which engages the first reference surface) and the airfoil to the reference surface on the second jaw 96; and, the airfoil and the mask to the sprue plate 62 through the second jaw and the base of the fixture and thence through the table of the apparatus to the housing 62. A small lateral adjustment might be required, for example, in the operative condition, depending on the size of gap G1 as compared to the gap G, to ensure that these components have the correct relationship in the operative condition. Thus, this relationship in the apparatus fro making the mask is the same or very easily adjustable to the same relationship as in the operative condition.

Certain thermoplastic polymers have characteristics which aid in disposing the laser blocking material 52 on the interior of the rotor blade 12 and in attenuating the intensity of the laser beam. These characteristics provide advantages during filling and drilling of the airfoil with a laser and advantages later as the blocking material is removed from the airfoil. For example, the laser blocking material comprises a thermoplastic polymer formed of only carbon and hydrogen. The thermoplastic polymer creates harmless products on complete combustion of the material during burnout of the material. The polymer also has a Melt Flow Index which is greater than about fifty (50) which promotes flow. The thermoplastic polymer is partially amorphous; but it is also partially crystalline such that the crystallinity is greater than forty percent (40%) to diffuse the beam of radiation from the laser.

Experiments have been performed using members of the polyolefin family. The term "polyolefin" and the particular forms of the polyolefins such as "polypropylene", "polyethylene", etc. include their copolymers and homopolymers. For example, these include linear low density polyethylene (LLDPE), low density polyethylene (LDPE), high density polyethylene (HDPE), polypropylene (PP).

One satisfactory material is a linear, low-density polyethylene available as Dowlex 2503 from the General Polymer Division of Ashland Chemical Company and is manufactured by the Dow Chemical Company, Midland, Mich. 48674. This polyethylene has a specific gravity of nine hundred and thirty seven thousandths (0.9370) at twenty three degrees Celsius (23° C.) and a Melt Flow Index of one hundred and five (105) using the standard of measurement set forth in ASTM D-1238-82 entitled "Flow Rates of Thermoplastics by Extrusion Plastometer." Melt Flow Index is determined for this polyethylene by flowing a number of grams of the polymer during a ten minute period through a known orifice at a temperature of one hundred and ninety degrees Celsius (190° C.) and under a load of about two and sixteen hundredths Kilograms (2.16 kg) which correspond to condition E of the ASTM standard. This polyethylene has an elongation at break of seventy five and two tenths percent (75.2%), a flexural modulus of seventy five thousand five hundred pounds per square inch (75500 psi), a tensile strength at break of eleven hundred pounds per square inch (1100 psi) and a tensile strength at yield of two thousand and ten pounds per square inch (2010 psi). The notched Izod impact strength is forty five hundredths (0.45) at sixty eight point two degrees Fahrenheit (68.2° F.) at one-hundred and twenty five thousandths 0.1250 inches (ft-lbs./in). The tensile impact strength is sixty two and four tenths (62.40 ft-lb./per square inch) at seventy three and two tenths degrees Fahrenheit (73.2° F.). The brittle temperature is thirty six degrees Fahrenheit (36° F.) and the Vicat Softening temperature is two hundred and twelve degrees Fahrenheit (212° F.). It is a copolymer of ethylene and Octene-1.

At temperatures over five hundred and seventy two degree Fahrenheit or three hundred degrees Celsius (572° F. or 300° C.) the material will release highly combustible gases. The specific gravity is less than one and may be even less than ninety five hundredths because it lies in a range of about eighty four hundredths to ninety seven hundredths (0.84 to 0.97) showing the absence of fillers. It has a fairly high molecular weight which is greater than one thousand (1000) and is formed of only carbon and hydrogen.

Polyolefins such as polypropylene, polyethylene, polybutylene, polyisoprene have the advantage of shear thinning coupled with their relatively good Melt Flow Index. The Melt Flow Index is measured at low shear conditions. As shearing of the polyethylene increases, the viscosity of the material precipitously decreases and may decrease as much as fifty percent (50%) or even greater amounts.

An advantage of using the injection molding machine for injecting the laser blocking material is that the machine itself and through the pressure it exerts, causes shear thinning of the polyethylene prior to the polyethylene reaching the chamber 12, causes shear thinning as it passes through the nozzle 70 and causes shear thinning, if required, in the internal passages of the airfoil 10.

Like Melt Flow Index, the shear thinning characteristic is an empirically defined parameter, critically influenced by the physical properties and molecular structure of the polymer and the conditions of measurement. It is determined by using a capillary rheometer but the parameter is not commonly available for materials at all temperatures and pressures because scientists and engineers have not focused on the criticality of the parameter, for example, for filling components having very narrow passages.

FIG. 7 is a graphical representation of the shear thinning characteristic for Dowlex 2503 polyethylene material as determined over a range of shear rates at a temperature of three hundred and seventy-five degrees Fahrenheit (375° F.) by Applicant's Assignee. ASTM D3835, Capillary Rheometer Test was used.

As shown in FIG. 7, the viscosity decreases precipitously from an initial value of about five hundred Pascal Seconds (500 PaS) at a shear rate of twenty per second to a value of less than two hundred Pascal Seconds (200 PaS) at a shear rate of two thousand per second (2000/sec). This represents a decrease of more than fifty percent (50%) from a molasses like liquid at the lower shear rate to a water like liquid as the material flows through the airfoil at shear rates much smaller than the shear rate of two-thousand per second (2000/sec).

As the material is flowed from small passages in the airfoil to large passages in the airfoil, the viscosity will increase as the polymer chains experience a smaller shear rate. However, as the polymer flows through the next smaller cross-sectional area, such as at the trailing edge, the material will once again shear thin because of the increased shear rate. The material will experience a decrease in viscosity and then will more easily flow through the smaller area. As the material flows out of the airfoil, the pressure on the material and temperatures of the material rapidly decreases, causing the material to experience a precipitous increase in viscosity and not flow to locating surfaces on the airfoil.

Accordingly, shear thinning is very helpful in filling modern airfoils with laser blocking material 52. Typically, the volume of the charge 74 of material injected into the airfoil is about five to ten percent (5% to 10%) greater than the internal volume of the airfoil to be filled to ensure complete filling of that volume. This volume of material must be forced into the airfoil, forced through the airfoil, and, to some extent, forced out of the airfoil to ensure complete filling of the airfoil. And yet, the material must have sufficient viscosity such that the material does run through the airfoil to unwanted locations on the airfoil surface. As mentioned, it must solidify in place fairly rapidly after injection as it flows into, through and out of the airfoil.

During the filling operation of the airfoil 10, for example, the thermoplastic polymer is forced into the blade at an extrusion pressure greater than about fifteen hundred pounds per square inch (1500 psi) and at a temperature at about or greater than three hundred degrees Fahrenheit (300° F.). There is a decrease in viscosity due to temperature. The temperatures of the material are expected to range between two hundred and fifty and five hundred and forty degrees Fahrenheit (250° F.–540° F.) for most materials in the polyolefin family. This allows the material to flow with low viscosity through the airfoil with the temperature causing a decrease in viscosity and the shear thinning causing a further decrease in viscosity.

In one application using the Dowlex 2503 material, the polyethylene was extruded at a pressure of sixteen hundred pounds per square inch (1600 psi) into an airfoil having passages and orifices having a hydraulic diameter which was less than forty (40) mils. In some applications, the passages may have a hydraulic diameter which is less than thirty (30) and even less than twenty five (25) mils. It is expected that as the polyethylene is flowed through the airfoil passages, further shear thinning takes place in the especially restricted regions of the airfoil such as the leading edge or the trailing edge region of the airfoil. In these regions, pedestals and small diameter holes retard movement of the material into cavities into which holes extending to the surface are drilled. Nevertheless, these airfoils were successfully filled, in part, because of the shear thinning characteristic of the laser blocking material in the airfoil. In other trials, the material was injected at a pressure of about two thousand pounds per square inch (2000 psi) with a temperature of the material that was less than five hundred and forty degrees Fahrenheit (540° F.) and that was in the range of about four hundred degrees Fahrenheit to about five hundred degrees Fahrenheit (400° F. to 500° F.). Polypropylene was also used with good results at similar pressures and at temperatures above its melting point.

During filling of the airfoil, the airfoil is disposed in the mask 78 with the masking members 82, 84 urged against the airfoil by the first and second jaws 92, 94. As mentioned, the table or the lever might be adjusted slightly to accommodate any difference between the gap G and the gap G1. The mask members apply an external pressure to the airfoil which blocks the loss of laser blocking material which might pass through the flow directing surfaces of the airfoil to unwanted locations on the airfoil. The mask members also reinforce the thin wall of the airfoil (which in some cases may be as small as twenty (20) mils) against deflection as the high pressure polyethylene material flows through the airfoil.

The laser blocking material flows quickly into the interior of the airfoil, with filling of even complex shapes taking less than one-minute and some cases about thirty (30) seconds. A particular advantage is the relatively low melting temperature of the material. As a result, the thermal capacitance of the airfoil is such that it absorbs heat from the material without increasing in temperature by an amount which makes handling difficult. In some trials, operators were able to handle the airfoils after filling with bare hands or with light gloves.

Even though the material loses heat to the adjacent metal in the airfoil, the material continues to flow until it fills those areas that require the disposition of laser blocking material. Solidification of the material occurs rapidly as the material loses heat to the airfoil. As a result, the airfoil can then be moved to a new location even with shaking and without concern about the material liquefying.

Another advantage of the blocking material is the resiliency which it demonstrates in solid form. This allows for easy inspection of holes drilled by the laser to ensure that the laser has penetrated through to the blocking material. For example, one way of inspecting a hole to make sure the hole has been drilled through the wall of the airfoil, is to probe through the hole with a thin wire. The wire exhibits a different response on contact with the resilient polyethylene material as compared to the contact that it would have against a hard component, such as the material. In many cases, the laser blocking material has flowed into the hole to such an extent that visual inspection of the hole shows the presence of polyethylene, thereby confirming the existence of a through hole.

During the drilling of a hole with the laser beam L, the coherent radiation of the laser beam vaporizes a wall, of the airfoil, such as the suction wall 42 or pressure wall 44, to form a cooling air hole 46. As the laser beam breaks through the wall on the interior of the airfoil, the laser beam strikes the polyolefin (polyethylene) material disposed on the interior of the airfoil.

The polyolefin blocking material is particularly effective at preventing the laser beam from unacceptably damaging the walls on the interior of the airfoil. Although the phenomenon in not well understood, it is believed that the crystallinity of the polyolefins helps this process. It is also believed that the specific heat and melting point of the polyethylene is such that a small portion of the polyethylene immediately forms a fluid, either in gaseous form or in the form of a liquid, upon being struck by the laser beam. If gas, the polyethylene gas is formed of carbon and hydrogen, a combustible mixture, but with the no oxygen being supplied by the material (since the material itself is formed of only carbon and hydrogen). This avoids the formation of sooty particles.

The plasma of the vaporized polyethylene is transparent to the laser beam to such an extent that it apparently does not degrade the ability of the laser beam to finish the drilling of the hole. In addition, the fluid does not appear to degrade the formation of the hole and, in fact, moves into the hole and may enhance the ability of the laser to leave a clean hole without blocking of the hole as a result of splatter from molten wall material of the airfoil being sucked into the hole.

Experimental drilling operations have shown a marked decrease in wall blockage at completion of the drilling operation. The percent blocked holes in one run decreased from about fifty percent to sixty percent (50% to 60%) to less than ten percent (10%). This decreases the need for rework of the airfoil and promotes even distribution of cooling air in the finished article.

Another advantage of the polyethylene in laser drilling is believed to be the amount of diffusion of the laser radiation that takes place for an incremental thickness of polyethylene material. It is believed that it is greater than many other materials used for blocking laser radiation. This may be linked to the relatively high crystallinity of polyolefins which is greater than forty percent (40%) and for the Dowlex polyethylene material, greater than sixty percent (60%). It is believed that polyolefins are preferable to other polymers because of the Melt Flow Index which is greater than fifty (50) and the melting point which is sufficiently high such that the large quantities of laser blocking material are not completely melted by the laser beam. As a result, in some drilling operations an additional pulse of laser energy beyond that experienced using conventional wax fill is possible, which also helps form a clean exit hole with minimal blocking by backscatter of the airfoil material.

It is possible to combine with the polyolefin small amounts of other polymers. One example is less than about five percent (5%) by weight of the other polymers as long as the other polymers do not degrade the performance of the polyolefin and do not pose an environmental risk on burnout of the material.

The addition of these other polymers to the polyolefin, or even additional amounts of other material to the thermoplastic polymer, is a concern because thermoplastic polymers formed of only carbon and hydrogen provide a significant advantage during removal of laser blocking material after the holes are drilled in the airfoil. One method of removing the laser blocking material is to heat the laser blocking material until it burns. One satisfactory temperature is about thirteen hundred (1300° F.) degrees Fahrenheit. A particular advantage of the polyolefin family and particularly polyethylene is the polymer breaks down to form a highly combustible gas which is very clean burning. The carbon and hydrogen of the polyethylene combine with oxygen from the combustion atmosphere to form carbon dioxide and water vapor. This leaves behind a very clean airfoil that does not require further processing to remove contaminants from the interior of the airfoil. In addition, scrubbers for removing harmful gasses from the burnout operation are not required provided significant oxygen is present to completely combust the laser blocking material. Finally, burnout provides the advantage of not having to flow additional solvents into the blade or to manipulate the blades.

In addition, the polyolefins have a relatively low melting temperature, particularly the polyethylenes. As the airfoil is heated to a higher temperature to remove the polyethylene by burning the polyethylene, the polyethylene melts and runs out of orifices in the blade instead of continuing to expand and place unwanted internal pressures on the airfoil.

Finally, the polyethylene has a resiliency characteristic prior to melting that allows the material to deform upon being deflected under load. The polyethylene material expands prior to melting as it is heated during the burnout operation. Expansion of the solid polyethylene material causes the material to deform, and openings in the airfoil may even allow the material to extrude so that all forces generated by thermal expansion of the material are not transmitted to the walls of the airfoil. The relatively thin walls of the airfoil are not deflected to an extent that would cause harmful residual stresses in the airfoil or failure of the airfoil during the burnout operation. In addition, burnout may be provided at a relatively low temperature to speed handling or at higher temperatures to decrease processing time as long as the temperature does not degrade the performance of the alloy from which the airfoil is made.

Although the invention has been shown and described with respect to detailed embodiments thereof, it should be understood by those skilled in the art that various changes in form and detail may be made without departing from the spirit and scope of the claimed invention

We claim:

1. A fixture for disposing a laser blocking material in an airfoil from a source for supplying blocking material under pressure, the airfoil having a first end and a second end spaced spanwise from the first end, the fixture having a passage for the blocking material, which comprises:

a sprue plate having a spanwise facing seal surface which faces the first end of the airfoil, the sprue plate having a portion of the passage for receiving blocking material extending through the sprue plate and in flow communication with the rotor blade through the seal surface; and, a member having a surface facing spanwise toward the seal surface of the sprue plate which is spaced spanwise from the sprue plate and which engages the airfoil, the surface of the member being softer than the material of the rotor blade;

wherein in the installed (operative) condition the source of pressurized blocking material is in flow communication with the passage and the passage is in flow communication with the airfoil; and wherein in the installed (operative) condition, the sprue plate is urged toward the first end of the airfoil to exert a force on the airfoil and the airfoil is urged against the member both to position the airfoil between the seal surface and the surface of the member, and, to urge the seal surface toward the first end of the airfoil to block the loss of material from the passage between the sprue plate and the first end.

2. The fixture for disposing a laser blocking material in an airfoil as claimed in claim 1 wherein the sprue plate has a side facing the airfoil which has the seal surface, wherein the side has another spanwise facing surface which has an area A1 facing spanwise toward the airfoil in the operative condition, and which is spaced in the spanwise direction a distance D from the seal surface, and wherein the seal surface has a spanwise facing area A2 which is less than the area A1 (A2<A1).

3. The fixture for disposing a laser blocking material in an airfoil as claimed in claim 2 wherein said side has a projection having the seal surface, the projection extending in a spanwise direction for the distance D and around the passage to provide a bounded perimeter about the passage, and wherein the seal surface engages the end of the airfoil and is pressed directly against the airfoil to form the seal about the passage.

4. The fixture for disposing a laser blocking material in an airfoil as claimed in claim 1 wherein a gasket is disposed between the seal surface and the end of the airfoil and wherein the sprue plate and the end of the airfoil are urged against the gasket under operative conditions.

5. The fixture for disposing a laser blocking material in an airfoil as claimed in claim 4 wherein the side having the seal surface has a recess which extends in the spanwise direction the distance D and which extends around the passage; and, wherein the gasket is disposed in the recess and extends about the passage, and the seal surface engages the gasket and presses the gasket against the end of the airfoil to block the loss of blocking material from the passage.

6. The fixture for disposing a laser blocking material in an airfoil as claimed claim 1 wherein the source for supplying blocking material includes a nozzle; wherein the fixture includes a sprue plate holder having a slot which adapts the sprue plate holder to slidably receive the sprue plate and includes means for preventing relative movement between the sprue plate and the sprue plate holder; wherein the sprue plate holder is adapted to be affixed to the source for supplying blocking material under pressure and has an opening which adapts the sprue plate holder to permit the nozzle to extend though the sprue plate holder and to engage directly the sprue plate; and, wherein the sprue plate has a surface facing spanwise away from the first end of the airfoil which adapts the sprue plate to sealingly engage the nozzle and, under operative conditions, to leave the nozzle pressed directly against the sprue plate to exert a sealing force at that location and wherein the sprue plate holder urges the sprue plate in the spanwise direction toward the first end of the rotor blade to exert a sealing force at the first end of the airfoil.

7. The fixture for disposing a laser blocking material in an airfoil as claimed in claim 1 wherein the member having a surface facing spanwise toward the seal surface is a block of material.

8. The fixture for disposing a laser blocking material in an airfoil as claimed in claim 7 wherein the block of material engages the second end of the airfoil.

9. The fixture for disposing a laser blocking material in an airfoil as claimed in claim 7 wherein the fixture has a plurality of blocks having different spanwise heights and wherein one of said blocks is the block used to engage the airfoil and wherein the fixture has a plurality of sprue plate each having a seal surface configured to engage a particular airfoil and wherein each sprue plate has an associated block such that the fixture may be easily modified to accept different airfoils having different spanwise lengths and different configurations at the first end.

10. A fixture having a passage for disposing a laser blocking material in a rotor blade from means for injecting the blocking material under pressure having a nozzle, the rotor blade having a first end and a second end spaced spanwise from the first end, which comprises:

A. a sprue plate having
  1) a portion of the passage extending spanwise through the sprue plate for receiving pressurized blocking material and in flow communication with the rotor blade,
  2) a first side having a first spanwise facing surface which faces spanwise away from the rotor blade in the operative condition and has an opening for receiving the pressurized blocking material,
  3) a second side having a second spanwise facing surface having an area A1 which faces spanwise toward the rotor blade in the operative condition, the second side having a projection which extends in the spanwise direction a distance S1 and which extends around the passage to provide a bounded perimeter about the passage, the projection further having a third seal surface which faces in the spanwise direction and which has a spanwise facing area A2 which is less than the area A1 (A2<A1);

B. a sprue plate holder having a slot which adapts the sprue plate holder to receive the sprue plate and means for preventing relative movement between the sprue plate and the sprue plate holder; and, C. a block of material having a fourth surface facing spanwise which is softer than the tip material of the rotor blade, which is spaced spanwise from the sprue plate holder by the spanwise length of the airfoil and which adapts the block to engage the tip of the airfoil;

wherein in the installed condition the sprue plate holder is integrally attached to the injection machine and the nozzle of the injection machine is pressed against the sprue plate to receive pressurized blocking material, and wherein in the installed condition the sprue plate is urged against the root of the airfoil and the airfoil against the block to form a seal between the third surface of the projection and the root.

11. The fixture for disposing a laser blocking material in an airfoil as claimed in claim 10 wherein the injection machine is an injection molding machine.

12. The fixture for disposing a laser blocking material in an airfoil as claimed in claim 4 wherein the material of the gasket is polytetrafluoroethylene.

13. The fixture for disposing a laser blocking material in an airfoil as claimed in claim 5 wherein the material of the gasket is polytetrafluoroethylene.

* * * * *